April 12, 1955        B. FOX        2,706,290
MONITORING SYSTEM
Filed Sept. 20, 1943        2 Sheets-Sheet 1
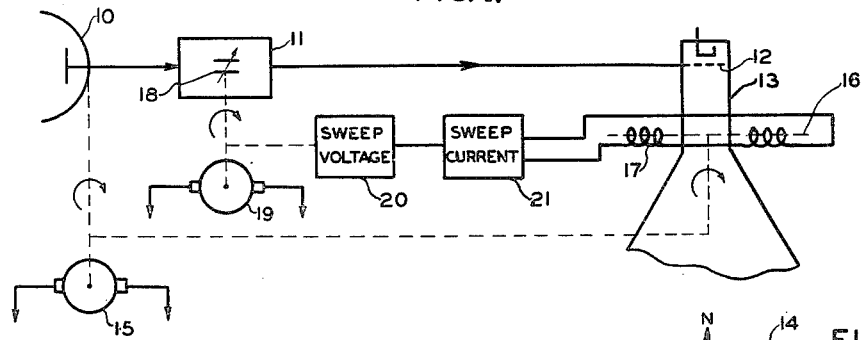
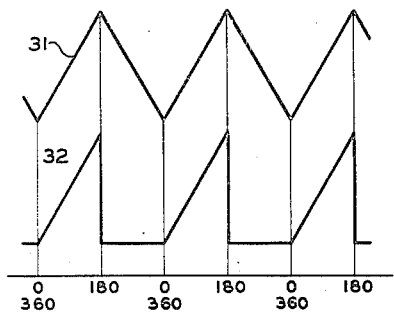
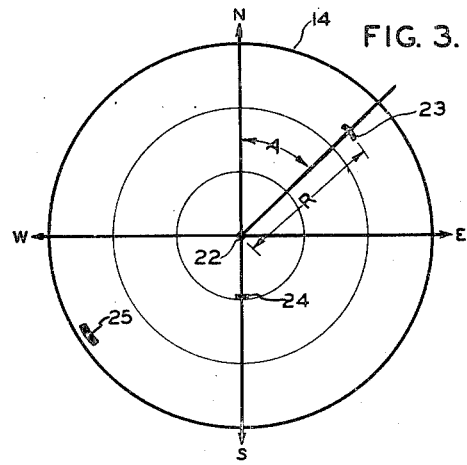
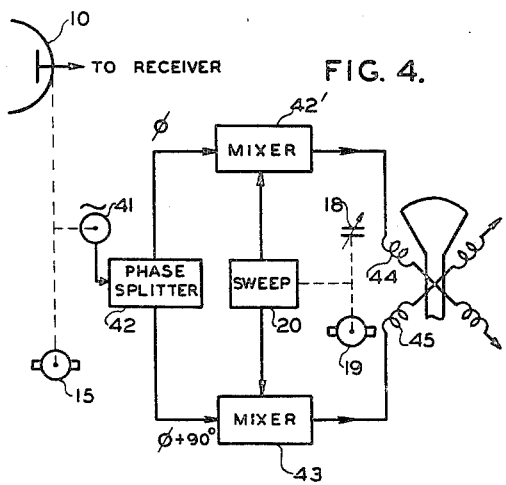
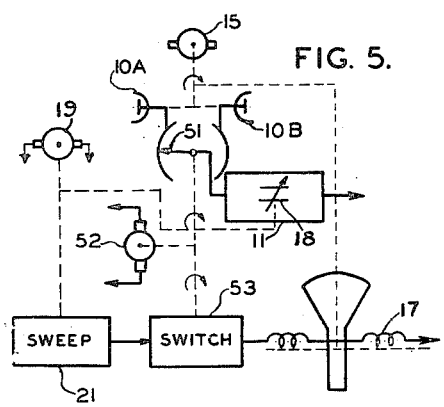
*INVENTOR.*
BENJAMIN FOX.
BY William D. Hall.
Attorney.

United States Patent Office 2,706,290
Patented Apr. 12, 1955

2,706,290

MONITORING SYSTEM

Benjamin Fox, New York, N. Y., assignor to the United States of America as represented by the Secretary of War Application September 20, 1943, Serial No. 503,033

20 Claims. (Cl. 343—112)

(Granted under Title 35, U. S. Code (1952), sec. 266)

The invention described herein may be manufactured and used by or for the Government for governmental purposes, without the payment to me of any royalty thereon.

This invention relates to radiated wave monitoring systems, more particularly to methods and means for indicating at a desired point the direction of incidence of all radio signals in a given wave band received at said point.

So called "panoramic" receivers are known which will simultaneously indicate the frequency of all signals received at a given location without regard to the direction of incidence. Direction finding systems are also known which will simultaneously indicate the direction of origin of all signals of a given frequency.

It is a main object of this invention to provide an improved receiver system for indicating the direction of incidence, and preferably also the frequencies, of all waves which are present at any given location.

This is done by means of a sharply directional radiated wave transducer, in this case an antenna system, sensitive to signals from only one direction from said location. The antenna is continuously rotated to change the effective direction of its response pattern. The antenna currents are applied to a receiver, the tuning of which is continuously varied. The receiver output is used to modulate the beam of a cathode ray tube. Said beam is deflected along one coordinate of the screen in synchronism with the antenna rotation, and deflected along another coordinate in synchronism with the receiver tuning. The resultant location of the screen image provides an indication of the frequency and direction of the signal. Several antennas, each having its lobe angularly spaced with respect to the lobes of the others, may be used to increase the effective scanning speed.

Such a system is obviously useful for providing a continuous check on all signals present so that any unauthorized transmissions can be easily detected and located. Another use for the invention is to provide continuous indication of the movement and location of a plurality of mobile bodies.

For a better understanding of the invention, together with other and further objects thereof, reference is had to the following description taken in connection with the accompanying drawings, wherein like parts are indicated by like reference numerals, and its scope will be pointed out in the accompanying claims.

In the accompanying drawings:

Fig. 1 is a schematic circuit diagram of my invention;

Fig. 2 is a graph illustrating certain phases of operation of the circuit in Fig. 1;

Fig. 3 is a diagram showing the appearance of signals on the screen of cathode ray tube in Fig. 1; and Figs. 4, 5 and 6 are schematic circuits of modifications of the invention.

Figure 6:
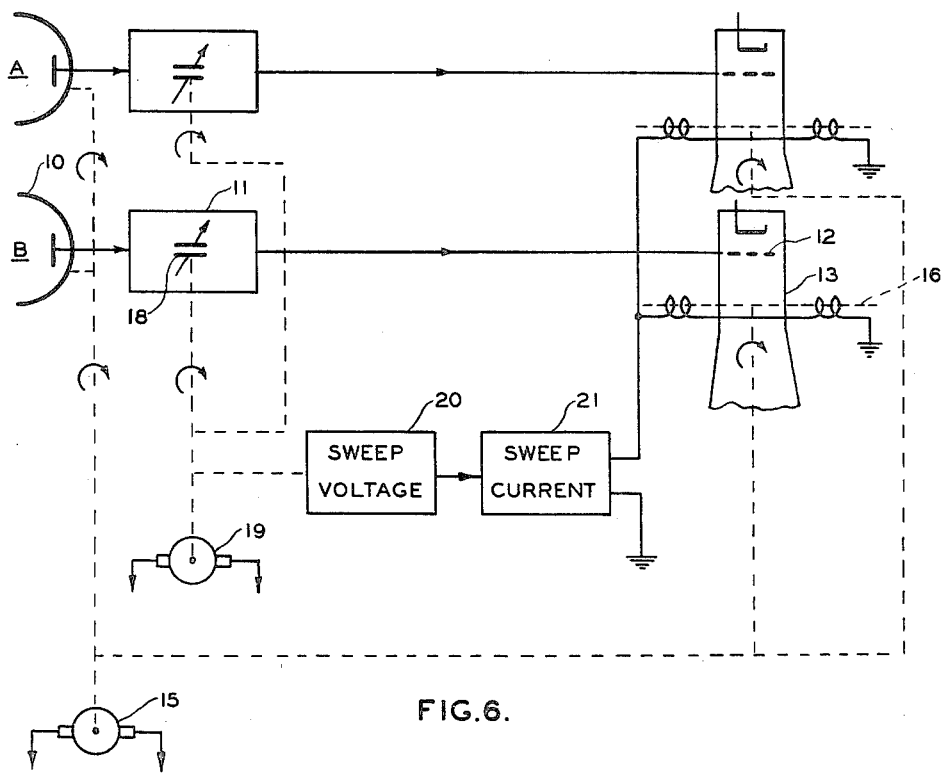

Referring now to Fig. 1, there is shown a sharply directional antenna 10 of a conventional type including a dipole and parabolic reflector. The output of said antenna is fed to a tunable receiver 11. The receiver output is fed to the intensity grid 12 of a cathode ray tube 13. A high negative bias (not shown) is applied, in a manner well known in the art, to grid 12 so that the cathode ray beam is normally blocked and no image is visible on the sceren 14 (Fig. 3) of tube 13. The signal output of the receiver serves to decrease said negative bias to a degree sufficient to unblock said beam, so that it will provide an indication on the screen. Alternatively, the beam can be left normally unblocked and the signal used to block the beam. Signals would then be indicated by a dark spot on a normally bright screen.

Antenna 10 is so designed that it will receive signals from only one direction. Its directivity pattern or lobe should be as narrow as possible so that only signals from said direction will produce any substantial response.

The direction in which said antenna is effective is continuously varied by means of a motor 15 which continuously rotates said antenna. Coupled to the antenna shaft for rotation therewith, as indicated by the dotted line, is the rotatable yoke 16 of a cathode ray deflecting magnet 17, so that the angle of the plane of beam deflection always corresponds to the angle of the vertical plane along which the antenna is responsive. The coupling means may be mechanical or of the servomotor type well known in the art.

The tuning of receiver 11 is adapted to be continuously varied by means of a tuning means, such as condenser 18, continuously driven by a motor 19, which also is coupled to a saw-tooth voltage generator 20. The saw-tooth voltage is transformed to a saw-tooth current by a network 21, which current is applied to deflecting coils 17. Networks 20 and 21 are well known and are similar to those generally used in the television art.

The relation between the change in tuning of the receiver and the saw-tooth current applied to deflecting coils 17 is shown in Fig. 2. Assuming the frequency changing condenser 18 is of the straight line frequency type, then curve 31 indicates change in frequency response of the receiver with rotation of the shaft condenser 18. Curve 32 shows the corresponding saw tooth current. It will be seen that the complete saw-tooth wave is generated for each alternate half cycle of rotation of the condenser shaft. This form of deflecting current is necessary for all tuning elements wherein the entire tuning range is covered by only one half revolution of the tuning shaft.

Apparatus for deriving the relations between the receiver tuning and the sweep voltage, such as shown in Fig. 2, is well known in the art. For several suitable constructions, reference is made to Chapter VI of "The Cathode Ray Tube at Work" by John F. Rider, and to Wallace Patent 2,312,203.

The beam of cathode ray tube 13 is normally positioned, by conventional beam positioning means (not shown), so that the saw-tooth current will deflect the beam radially from the center 22 of the screen 14 toward the periphery thereof.

Referring now to the operation of the circuit thus far described, the frequency response of receiver 11 is continuously varied. In synchronism therewith, the beam deflecting current will likewise be varied in such manner that the magnitude of said current will vary with the resonant frequency of the receiver. Preferably, the variation of deflecting current should bear a substantially linear relationship to the variation in resonant frequency. Should a signal be present, it will unblock the cathode ray beam and a spot such as 23, 24, or 25 will appear on screen 14, the radial distance R of said spot being substantially proportional to the frequency of said signal.

Moreover, since the deflecting magnet 17 rotates with the antenna shaft, the angle of the plane of beam deflection will correspond to the direction in which the antenna is pointing. Hence the angle A of said spot with respect to a predetermined direction, e. g. the north direction, will indicate the azimuth of the signal source. Suitable calibrations can be formed directly on the screen or juxtaposed thereto.

To provide for continous indication of all signals present in the receiver output, it will be necessary to rotate the antenna and tuning condenser as rapidly as possible. By using long persistence screens, the rate of antenna rotation can be as low as 5–10 R. P. M. The tuning means 18 must be rotated much more rapidly than the antenna. In order to provide accurate azimuth indication, the tuning of the receiver must be varied throughout its entire tuning range during as small an increment of antenna rotation as possible. This will be evident from the following considerations: The beam is progressively displaced radially along the screen, in synchronism with receiver tuning, and displaced arcuately, in synchronism with antenna rotation. The true path of the beam along the face of the screen will therefore be spiral. However, if the radial displacement is very fast with respect to the arcuate displacement, i. e. if the beam sweeps the entire distance from the center to the outer circumference of the screen during as small a fraction of a degree of arcuate displacement as possible, then the spiral path of beam will approach a radial path.

If both the directivity of the antenna and the selectivity of the receiver were perfect then the spot 23 on the screen would approach a point for each direction and signal frequency. In practice, however, spot 23 would appear as an arc, the length of which depends on the sharpness of directivity of the antenna and the thickness, or radial dimension, of which depends on the selectivity of the receiver.

The antenna should be of the broad band type, or it may be tunable in synchronism with the receiver. Alternatively, the antenna response may be peaked nearer to one edge of the band and the receiver response peaked at the other edge of the band.

Several antennas, receivers, and cathode ray tubes may be used to cover different frequency bands. All antennas may be mounted on the same rotating tower, all receivers tuned by the same tuning motor, all deflecting magnets energized by the same sweep current generator, and all deflecting magnet yokes driven in synchronism with the rotating tower. Such a system is shown in Figure 6, wherein channels A and B are tunable over different frequency bands, but otherwise identical.

With the tuning system above described, half of each rotation of the tuning condenser is wasted, since signals tuned in during such half rotations are not indicated. To permit two indications per revolution of the condenser, use may be made of the type of tuning means shown in the Labin et al. Patent 2,303,214, which uses two oppositely varying tuning condensers, both rotating in unison and each being alternately switched in every half revolution of the tuning shaft. This will also necessitate the generation of a complete saw-tooth current cycle for every half revolution. Another suitable system for obtaining the same result is shown in Fig. 29 of the Wallace patent, supra.

Reference is now made to Fig. 4 which shows a modification of the above described system. Use is made of a pair of stationary deflecting magnets 44 and 45, which respectively deflect the beam along paths perpendicular to each other, to rotate the plane of deflection of a cathode ray beam in synchronism with the antenna rotation. For this purpose the antenna shaft is coupled to a sine wave generator 41 which generates one cycle of voltage for each complete rotation of the antenna. The output of generator 41 is applied to a phase splitter 42 which converts said output to two alternating current voltages, one having a 90° phase displacement with respect to the other. These voltages are combined with the output of sweep voltage generator 20 in mixers 42' and 43. The output of mixers 42' and 43 are respectively applied to magnets 44 and 45.

The resultant currents in each deflecting magnet will be a series of saw-tooth waves, the peak amplitudes of which vary sinusoidally in synchronism with antenna rotation, the sinusoidal variation in one channel being phase displaced 90° with respect to the sinusoidal variation in the other channel. The resultant beam displacement across the screen of the tube will therefore be radial with change in the receiver tuning and circular with the change in antenna direction.

For a more detailed description of suitable circuits for use with the system in Fig. 4, reference is made to Poch Patent 2,313,966. A similar circuit using electrostatic beam deflection is described on page 53 of the August 1942 issue of "Electronics."

Fig. 5 illustrates a further extension of the system shown in Fig. 1, which permits an increase in the effective scanning speed without increasing the speed of antenna rotation. A pair of rotating antennas 10A and 10B, having oppositely directed response lobes, are driven together by the same motor 15. Each antenna is alternately connected to the receiver by a rapidly rotating switch 51 driven by a motor 52. The same motor also drives a switch 53 which reverses the direction of the cathode ray deflection in synchronism with the antenna switching. The speed of switching should be as high as possible. All the other elements of this circuit may be the same as in Fig. 1.

It will be seen that with the use of two antennas each direction will be scanned twice during each complete antenna rotation. Similarly, by using four antennas having lobes displaced at 90° intervals and two sets of rotating deflecting magnets, one set deflecting the cathode ray at right angles to the deflecting direction of the other set, and by synchronously switching the antenna lobe direction and the corresponding direction of beam deflection, the effective scanning speed of the system will be four times that possible with a single antenna rotating at the same speed.

In general, therefore, the effective scanning speed of a rotating multiple antenna system is equal to the speed of rotation multiplied by the number of antennas. This permits either using either slower rotation speeds or cathode ray screens having lower image persistance factors. With such screens better image definition is possible and the indications are less affected by noise currents and other types of random interference.

The speed of antenna switching should be much faster than the antenna rotation speed but not as fast as the speed of rotation of the receiver tuning condenser. In other words, for a very small increment of antenna rotation, switches 51 and 53 must be reversed as many times as possible. Likewise, for each switch reversal, the tuning of the receiver should be varied from one end of its freqeuncy range to the other at least once, and preferably as many times as possible.

Although mechanical switching of the antennas is shown, it is obvious that other known methods of switching, e. g. electronic, capacitative, inductive, etc., can be used. Electronic reversal of the sweep current can also be accomplished by well known methods.

The multiple antenna system can be used with other types of directional radio receiving or transmitting systems for increasing the effective scanning speed, e. g. pulse-echo object location systems, which provide a continuous indication of the movement and location of a plurality of mobile bodies. Such systems are described in greater detail and claimed in my copending application, titled "Signalling Means and Methods," Serial No. 526,304, filed March 13, 1944.

The receiver used with this system should preferably have means for varying its selectivity. A wide acceptance band can be used for preliminary searching. When a signal is spotted, the acceptance band of the receiver can be reduced so that the frequency of the signal will be more accurately indicated.

Instead of providing screen indications in polar coordinates, in the manner above described, any other suitable system of coordinates, e. g. rectangular coordinates, can be used. Thus the cathode ray beam can be displaced horizontally in synchronism with antenna rotation, and vertically in synchronism with receiver tuning. The receiver output will likewise be impressed on the intensity grid of the tube. Well known mechanical and optical equivalents of the cathode ray tube may be used for indication.

While there have been described what are at present considered preferred embodiments of the invention, it will be obvious to those skilled in the art that various changes and modifications may be made therein without departing from the invention, and it is, therefore, aimed in the appended claims, to cover all such changes and modifications as fall within the true spirit and scope of the invention.

I claim:

1. In the operation of a radiated wave receiving system comprising at least two wave pickup devices, each having a unidirectional response lobe, one of said lobes extending in a direction which is at a predetermined angle to direction of the other lobe, a wave translating means, a cathode ray indicator controlled by said means and having electron beam generating means, a fluorescent screen responsive to said beam, and means to deflect said beam; the method of indicating on said screen the direction of incidence of all signals to which said system is responsive, comprising the steps of continuously rotating said pickup devices in unison and synchronously therewith rotating the plane of deflection of said beam, successively impressing the energy of said respective pickup devices upon the input of said translating means and simultaneously therewith rotating the plane of said beam deflection in a given sense by an amount equal to the angle between said lobes, the rate of said pickup rotation being a minor fraction of the rate of said successive impression of energy, whereby a scanning speed for given azimuthal sector is obtained which is proportional to the number of said pickup devices.

2. In the operation of a radio wave receiving system comprising at least two antennas, each having a relatively narrow unidirectional response lobe, one of said lobes extending in a direction which is opposite to the direction of the other lobe, a receiver, a cathode ray indicator having electron beam generating means, a fluorescent screen excited by said beam, beam intensity control means energized by the output of said receiver, and means to deflect said beam in opposite directions from its normal position; the method of indicating on said screen the direction of incidence of all waves to which said system is responsive, comprising the steps of alternately impressing the energy of said respective antennas upon the input of said receiver and simultaneously therewith causing said beam to be alternately deflected in opposite directions in a given plane, and continuously rotating said antennas in unison and synchronously therewith rotating the plane of deflection of said beam through the sector of the azimuth covered by the corresponding lobe.

3. In the operation of a radio wave receiving system comprising at least one antenna having a relatively narrow unidirectional response lobe, a receiver excited by said antenna and tunable to any frequency in a predetermined band, a cathode ray indicator having electron beam generating means, a fluorescent screen responsive to said beam, and beam intensity control means energized by the output of said receiver; the method of indicating on said screen the frequency and direction of incidence of all incoming signals to which said system is responsive, comprising the steps of successively tuning said receiver to said signals from one end of its band to the other, and simultaneously deflecting said beam radially, the instantaneous extent of said deflection corresponding to the instantaneous response frequency of said receiver, continuously rotating said antenna and synchronously therewith rotating the plane of deflection of said beam, whereby a signal in the receiver output will be indicated on said screen at a point, the radial distance of which indicates the frequency of said wave, and angle of the radial line through said point with respect to a datum line indicates the angle of incidence of said wave.

4. In the operation of a radio wave receiving system having at least two antennas having relatively narrow unidirectional response lobes, one extending at a predetermined angle to the other, a receiver tunable to any frequency in a predetermined band, a cathode ray indicator having electron beam generating means, a fluorescent screen responsive to said beam, and beam intensity control means energized by the output of said receiver; the method of indicating on said screen the frequency and direction of incidence of all signals to which said system is responsive, comprising the steps of cyclically varying the response frequency of said receiver from one end of its band to the other and simultaneously deflecting said beam radially, the extent of said radial deflection being a function of the instantaneous response frequency of said receiver, continuously rotating said antenna in unison and synchronously therewith rotating the plane of deflection of said beam, alternately impressing the energy of said antennas upon the input of said receiver and simultaneously therewith rotating the plane of said beam deflection by an amount equal to the angle between said lobes.

5. In the operation of a radio wave receiving system having at least two antennas having relatively narrow unidirectional response lobes respectively extending in opposite directions, said system also including a receiver tunable to any frequency in a predetermined band, a cathode ray indicator having electron beam generating means, beam intensity control means energized by the output of said receiver, a flourescent screen excited by said beam, and means to deflect said beam in opposite directions from its normal position; the method of indicating on said screen the frequency and direction of incidence of all signals to which said system is responsive, comprising the steps of repeatedly varying at a uniform rate the response frequency of said receiver from one end of its band to the other, generating a substantially linear saw-tooth energy wave the instantaneous amplitude of which is proportional to the instantaneous response frequency of said receiver, causing said energy wave to deflect said beam from its normal position, continuously rotating said antennas in unison and synchronously therewith rotating the plane of deflection of said beam, alternately switching said antennas into the input of said receiver and simultaneously therewith reversing the direction of said beam deflection, the rate of said receiver response frequency variation being considerably greater than the rate of antenna switching, which is in turn considerably greater than the rate of said antenna rotation.

6. A radio system comprising at least one rotatable antenna having a unidirectional response lobe, a receiver coupled to said antenna, means to successively tune said receiver to different frequency waves impressed upon said antenna, a cathode ray tube having means for generating a sharp beam of electrons, a flourescent screen excited by said beam, beam intensity control means excited by the output of said receiver, and means to continuously alter the tuning of said receiver and simultaneously generate a varying potential, the instantaneous amplitude of which is a function of the instantaneous frequency to which said receiver is tuned, means responsive to said potential to move said beam along one coordinate of said screen, means to rotate said antenna and synchronously therewith move said beam along another coordinate of said screen.

7. A radio frequency spectrum monitoring system comprising at least one rotatable antenna having a unidirectional response lobe, a receiver coupled to said antenna, means to successively tune said receiver to different frequency waves impressed upon said antenna, a cathode ray tube having means for generating a sharp beam of electrons, beam intensity control means excited by the output of said receiver, a flourescent screen excited by said beam, and rotatable means to deflect said beam from its normal position, means to continuously alter the tuning of said receiver and simultaneously generate a varying potential, the instantaneous amplitude of which is a function of the instantaneous frequency to which said receiver is tuned, said beam deflecting means being excited by said potential and means to rotate said antenna and synchronously therewith rotate said beam deflecting means, whereby the plane of beam deflection is moved in synchronism with the effective direction of the antenna lobe.

8. A radio frequency spectrum monitoring system comprising at least a pair or rotatable antennas having unidirectional response lobes one of which extends at a predetermined angle to the other, a tunable receiver, a cathode ray tube having means for generating a sharp beam of electrons, beam intensity control means excited by the output of said receiver, a fluorescent screen excited by said beam, and rotatable means to deflect said beam in opposite direction from the axis of said tube, means to continuously alter the tuning of said receiver and to simultaneously generate a varying potential, the instantaneous amplitude of which is a function of the instantaneous frequency to which said receiver is tuned, said beam deflecting means being excited by said potential, means to rotate said antennas and synchronously therewith rotate said beam reflecting means, whereby the plane of beam deflection is rotated in synchronism with the effective direction of the antenna lobes, and switching means to alternately apply the output of said antennas to said receiver and to simultaneously so control the polarity of said potential that the direction of beam deflection always corresponds to the direction of the lobe of the antenna connected to the receiver.

9. A system comprising at least a pair of identical directional radiation-transducing means respectively having lobes which are spaced at a fixed angle relative to each other, the annular extent of said lobes being less than the spacing therebetween, means to progressively and simultaneously rotate at the same rate the effective directions of said lobes, a wave converting means, means for alternately switching the energy in the respective lobes into the input of said wave converting means at a rate which is faster than the rate of rotation of the effective directions of said lobes, means for generating an indicating beam, means responsive to the energy in the output of said converting means to control said beam, means synchronized with said switching for cyclically deflecting said beam, and means for shifting the plane of beam deflection in synchronism with the rotation of said lobes and through the sector of the azimuth covered by the corresponding lobe.

10. A system comprising a plurality of identical directional wave-pickup means respectively having response lobes which are angularly spaced relative to each other by a fixed amount, the angular extent of said lobes being less than the spacing therebetween, means to progressively and simultaneously rotate the effective directions of said lobes at the same rate, a wave translating means, means for successively switching the energy in the respective lobes into the input of said wave translating means at a rate which is faster than the rate of rotation of the effective direction of said lobes, means for generating an indicating beam, means responsive to the energy in the output of said translating means to control the intensity of said beam, means synchronized with said switching for alternately deflecting said beam along directions which are angularly spaced by an amount corresponding to the angular spacing between said lobes, and means for rotating the plane of said beam directions in synchronism with the rotation of said lobes and through the sector of the azimuth covered by the corresponding lobe.

11. A system comprising at least a pair of identical directional wave-pickup devices respectively having response lobes which are angularly spaced relative to each other by a fixed amount, the angular extent of said lobes being less than the spacing therebetween, means to progressively and simultaneously rotate the effective directions of said lobes at the same rate, a wave translating means, means for alternately switching the energy in said respective wave-pickup devices into the input of said wave translating means at a rate which is faster than the rate of rotation of the effective directions of said lobes, means for generating an indicating beam, means responsive to the energy in the output of said translating means to control the intensity of said beam, means synchronized with said switching for alternately deflecting said beam along directions which are angularly spaced by an amount corresponding to the angular spacing between said lobes, and means for rotating said beam directions in synchronism with the rotation of said lobes through the sector of the azimuth covered by the corresponding lobe.

12. The system as set forth in claim 11, wherein said fixed amount is 180°.

13. The system as set forth in claim 11, wherein said lobes are unidirectional.

14. A spectrum monitoring system comprising a plurality of channels, a tuning device in each of said channels to respectively tune them over different frequency bands simultaneously, means to provide simultaneous indications of the frequency components in the outputs of said channels, said last-named means having at least first and second controls, means coupling the output of each channel to the first control of the indicating means associated therewith, and common means for simultaneously operating of all said tuning devices and said second control.

15. A system as set forth in claim 14, including a directional antenna coupled to each of said channels, a third control for the indicating means, and common means for simultaneously varying the effective directions of all of said antennas and operating said third control.

16. A system as set forth in claim 14, wherein the indicating means is a cathode-ray tube, and wherein said controls control the beam thereof.

17. A system as set forth in claim 16, wherein said first control varies the intensity of said beam, and wherein said second control deflects said beam.

18. A spectrum analyzing system comprising a plurality of channels, a tuning device in each of said channels to simultaneously tune them over different frequency bands respectively, cathode-ray means coupled to said channels to independently indicate the frequency components in the outputs thereof, said cathode-ray means having control means independently varied by the outputs of the respective channels, means coupled to said cathode-ray means to generate an independent time base for each channel, and common means for varying all of said tuning devices and for controlling the generation of said time bases.

19. A system as set forth in claim 18, wherein said control means varies the beam intensity of said cathode-ray means.

20. A separate system as set forth in claim 18, including a directional antenna coupled to each of said channels, and common means for rotating the effective directions of the antennas and for generating said time bases.

References Cited in the file of this patent

UNITED STATES PATENTS

| Number | Name | Date |
|---|---|---|
| 1,717,455 | Kolster | June 18, 1929 |
| 1,897,633 | Dalpayrat | Feb. 14, 1933 |
| 1,917,268 | Mirick | July 11, 1933 |
| 1,945,096 | Tellegen | Jan. 30, 1934 |
| 1,997,271 | Zepler | Apr. 9, 1935 |
| 2,037,498 | Clay | Apr. 14, 1936 |
| 2,214,342 | Neufeld | Sept. 10, 1940 |
| 2,244,177 | Schaper | June 3, 1941 |
| 2,263,377 | Busignies et al. | Nov. 18, 1941 |
| 2,279,151 | Wallace | Apr. 7, 1942 |
| 2,279,246 | Podliasky et al. | Apr. 7, 1942 |
| 2,280,562 | Weagant | Apr. 21, 1942 |
| 2,312,203 | Wallace | Feb. 23, 1943 |
| 2,380,929 | Ahier et al. | Aug. 7, 1945 |
| 2,396,112 | Morgan | Mar. 5, 1946 |

FOREIGN PATENTS

| Number | Country | Date |
|---|---|---|
| 542,634 | Great Britain | Jan. 21, 1942 |